UNITED STATES PATENT OFFICE.

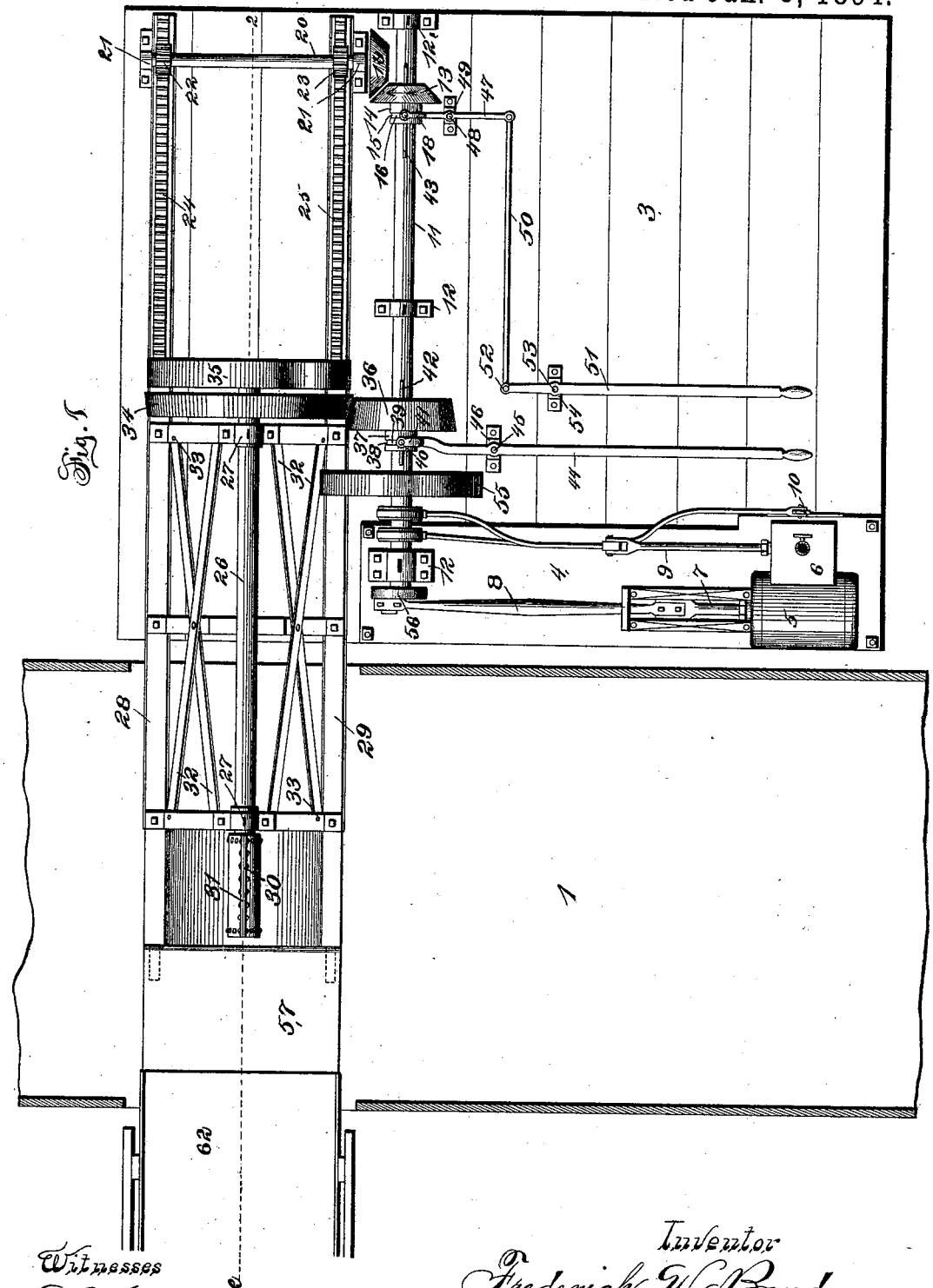

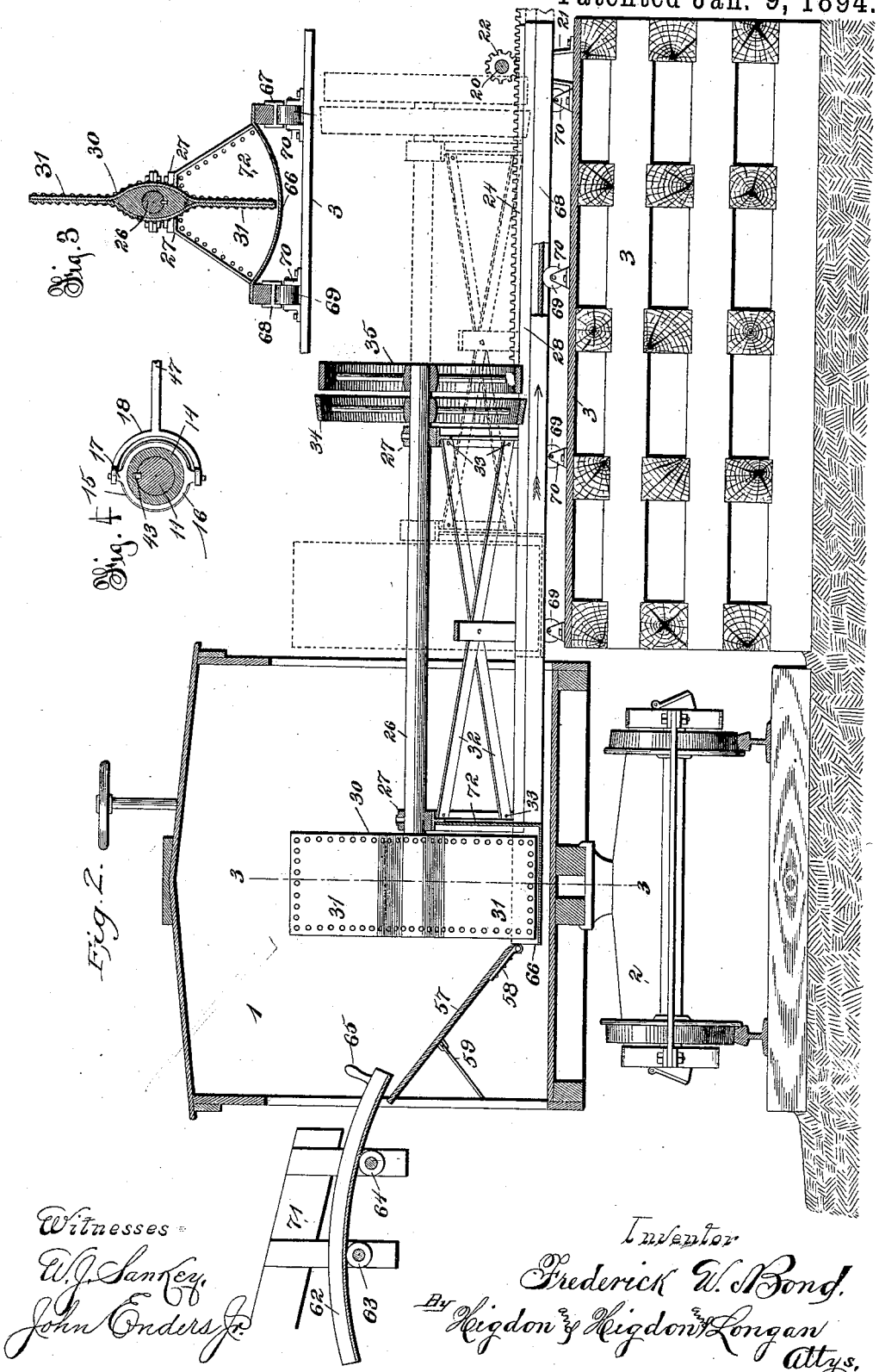

FREDERICK W. BOND, OF ST. LOUIS, MISSOURI, ASSIGNOR OF ONE-HALF TO E. J. CRANDALL, OF SAME PLACE.

CAR-LOADER.

SPECIFICATION forming part of Letters Patent No. 512,575, dated January 9, 1894.

Application filed July 17, 1893. Serial No. 480,727. (No model.)

*To all whom it may concern:*

Be it known that I, FREDERICK W. BOND, of the city of St. Louis and State of Missouri, have invented certain new and useful Improvements in Car-Loaders, of which the following is a full, clear, and exact description, reference being had to the accompanying drawings, forming a part hereof.

My invention relates to an improved car loader and consists in the novel arrangement, construction and combination of parts, as will be more fully hereinafter described and designated in the claims.

The object of my invention is to provide an improved steam power apparatus for loading coal cars, which shall be simple in construction and operation and of low cost.

In the drawings: Figure 1 is a plan view of my invention, showing it in position for use. Fig. 2 is a sectional side elevation of same, through the line 2—2 of Fig. 1. Fig. 3 is a sectional elevation through the line 3—3 of Fig. 2. Fig. 4 is an enlarged section through one of the sliding collars.

1 indicates a car of common form which has trucks 2.

3 indicates a foundation which supports my invention, in proper position for use.

4 indicates a base of a steam engine, 5 a steam cylinder, 6 a steam-chest, 7 a piston-rod, 8 a drive-shaft, and 9 an eccentric-rod which has a reversing lever 10 connected therewith.

11 indicates a shaft which has bearings 12; said bearings are connected with the foundation and extend upwardly to support said shaft in a suitable position for operation. Mounted upon said shaft 11 is a sliding beveled friction wheel 13, said friction wheel 13 being provided with a boss 14 formed integral therewith. Said boss is provided with a groove 15 to admit a collar 16. The collar 16 is provided with lugs 17 to engage a yoke 18 for the purpose hereinafter more clearly described.

19 indicates another beveled friction-wheel which is connected to a shaft 20; said shaft 20 is provided with bearings 21. Mounted upon the shaft 20 are two toothed pinions 22 and 23, said toothed-pinions being in engagement with toothed-racks 24 and 25 for the purpose more clearly hereinafter described.

26 indicates a horizontal shaft which is provided with bearings 27. Said bearings 27 are connected to horizontal frames 28 and 29 and extend upwardly a suitable distance to support the shaft 26. Mounted upon one end of the shaft 26 is a revolving knocker 30 having one or more flat arms 31. Connected to the upper and lower portions of the bearings 27 are braces 32. Said braces 32 are connected to the bearings 27 by rivets or bolts 33. Mounted upon the shaft 26 at the opposite end of the knocker 30 is a friction-wheel 34 and a fly-wheel 35. Mounted upon the shaft 11 is another friction-wheel 36, having a face somewhat wider than the friction-wheel 34.

Formed on and integral with the friction-wheel 36 is a boss 37, said boss being provided with a groove 38 to admit a collar 39. The collar 39 is provided with a lug or projection 40 adapted to engage the ends of a yoke 41. The beveled wheels 36 and 13 are feathered on the shaft 11 by means of feathers 42 and 43 respectively, so that each wheel can slide longitudinally on said shaft. Connected to the yoke 41 is a hand lever 44. The lever 44 is pivoted at 45 to a bracket 46, the bracket 46 being connected to the foundation 3 for the purpose hereinafter described.

Connected to the yoke 18 is a lever 47, the lever 47 being pivoted at 48 to a bracket or stand 49 and said bracket or stand 49 is connected to the foundation 3. Pivoted to the opposite end from the yoke 18 of the lever 47 is a connecting-rod 50, said rod being pivoted to a hand-lever 51 at 52. The hand-lever 52 is pivoted at 53 to a bracket or stand 54. Said bracket or stand 54 is connected to the foundation 3.

Mounted upon the shaft 11 is a fly-wheel 55 and a crank-wheel 56 of the engine.

Hinged to the frames 28 and 29 adjacent the inner end is an apron 57 by means of hinges 58. The apron 57 is held at an angle of about forty-five degrees by means of a sharp pin 59 connected to the apron 57. Said pin is adapted to stick in the side of the car to retain the apron at an angle while in operation.

62 is a curved chute being mounted on rollers 63 and 64.

65 is a handle connected with the side of the chute 64 for the purpose hereinafter mentioned.

66 is a trough directly beneath the knocker 30 and secured to the inner ends of said frames. This trough is curved transversely of said frames 28 and 29 so that its upper surface rests closely adjacent the outer ends of the arms of the revolving knocker 30.

67 and 68 indicate tracks which are supported on the rollers 69. The rollers 69 are mounted in bearings 70, the bearings 70 being connected to the foundation 3.

The operation of my invention is as follows: The coal being fed from the chute 71 which is fixed at the side of the track, falls on the chute 62 and thence on the apron 57 and slides down into the trough 66 and is prevented from going any farther by a vertical apron 72 adjacent the outer ends of the arms of the knocker 30. The knocker revolving in either direction strikes the material and throws it to the end of the car. When one end of the car is filled with the required amount the engine being reversed the same operation is performed to fill the opposite end of the car. When the car is loaded with the desired amount, the operator moves the hand lever 51 to the right. (See Fig. 1 for illustration.) By so doing it will connect the friction wheel 13 to the friction-wheel 19, which will cause the friction-wheel 19 to revolve in the direction indicated by the arrow. The friction wheel 19 and the toothed-wheels 22 and 23 being permanently connected to the shaft 20, and the toothed-wheels 22 and 23 being in engagement with the racks 24 and 25 and the racks 24 and 25 being permanently connected to the frames 28 and 29 will cause the frames to move in the direction indicated by the arrow to the position shown by dotted lines in Fig. 2, thus allowing the car to move away without disturbing the loader. Friction wheels 34 and 36 are preferably used so that they will make contact without shock or danger of breaking the adjacent parts. When it is desired to run the loader out of the car the apron 57 is swung up toward the revolving knocker, and with its upper face in contact therewith.

What I claim is—

1. The improved coal-car loader, consisting in the combination of a fixed foundation at the side of a railway-track, a steam-engine, means for reversing said engine, a beveled-friction-wheel 13 feathered upon the main shaft of this engine, means for moving this wheel longitudinally on this shaft, another friction-wheel feathered upon said shaft, means for moving the last mentioned wheel longitudinally on said shaft, a sliding carriage mounted to slide longitudinally of and parallel to the main shaft of said engine, a shaft 26 mounted upon said carriage parallel to said main shaft, a revoluble knocker mounted upon said shaft 26, a friction-wheel 34 also mounted on said shaft 26 to engage a friction-wheel on the main shaft of the engine when said carriage is run into or upon a car, and to be disengaged from said friction-wheel on the engine shaft when said carriage is moved in a reverse direction and withdrawn from said car, a toothed-rack 24 mounted on said carriage, a shaft 20 mounted on said foundation so as to extend transversely of said carriage, a pinion 22 fixed on said shaft 20 to engage said toothed-rack, a beveled friction wheel 19 fixed on said shaft 20 to be engaged by said beveled friction-wheel 13, and a chute for directing the coal into contact with the revoluble knocker after same has been run into a car, substantially as herein specified.

2. The improved car loader, constructed with a fixed chute at one side of a railway-track, a chute curved longitudinally and mounted on rollers beneath said fixed chute, and arranged to distribute material within a car on said track, in combination with a knocker arranged to knock the material thus discharged to each end of said car, substantially as herein specified.

3. The improved car-loader, constructed with a revoluble-knocker mounted to be run into and out of a car, a motive-power engine for revolving said knocker when above the floor of the car, a friction-wheel carried by said engine at one side of the track, another friction-wheel carried by the frame of said knocker and which engages said first-mentioned wheel when said knocker is above said floor ready to work, and a friction-gear for running said knocker into and out of said car, substantially as herein specified.

In testimony whereof I affix my signature in presence of two witnesses.

FREDERICK W. BOND.

Witnesses:
EDWARD EVERETT LONGAN.
JNO. C. HIGDON.